(12) United States Patent
Kobayashi et al.

(10) Patent No.: US 8,305,185 B2
(45) Date of Patent: Nov. 6, 2012

(54) THERMISTOR ELEMENT

(75) Inventors: Hirokazu Kobayashi, Tokyo (JP);
Masao Kabuto, Tokyo (JP); Masahiro Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/212,678

(22) Filed: Aug. 18, 2011

(65) Prior Publication Data
US 2012/0049996 A1    Mar. 1, 2012

(30) Foreign Application Priority Data

Aug. 26, 2010  (JP) .................... 2010-189942

(51) Int. Cl.
    *H01C 7/10*    (2006.01)
(52) U.S. Cl. ........ 338/22 R; 338/25; 428/697; 252/518.1
(58) Field of Classification Search ............. 338/22 R, 338/20, 25, 328, 254; 428/697; 252/500, 252/518, 520
See application file for complete search history.

(56) References Cited

U.S. PATENT DOCUMENTS

| | | | | |
|---|---|---|---|---|
| 6,835,684 B2 * | 12/2004 | Tietz et al. | ..................... | 501/134 |
| 6,878,304 B2 * | 4/2005 | Ogata et al. | .............. | 252/62.3 R |
| 7,656,269 B2 * | 2/2010 | Mizoguchi et al. | ......... | 338/22 R |
| 8,147,990 B2 * | 4/2012 | Cernoch et al. | ............... | 428/697 |

FOREIGN PATENT DOCUMENTS
JP    2003-183075    7/2003
* cited by examiner

*Primary Examiner* — Kyung Lee
(74) *Attorney, Agent, or Firm* — Muncy, Geissler, Olds & Lowe, PLLC

(57) ABSTRACT

A highly-reliable thermistor element even when used at a relatively high temperature comprising; element body incorporating two or more internal electrode layers arranging thermistor layer in-between, a pair of terminal electrodes each connected to the mutually faced internal electrode layers and formed on exterior surface of the element body, and lead terminal connected to the terminal electrode, characterized in that the thermistor layer comprises oxide expressed by a composition formula $Y_a Ca_b Cr_c Al_d M1_e O_3$ and the thermistor layer substantially does not include Sr or Mn.

4 Claims, 2 Drawing Sheets

THERMISTOR ELEMENT

BACKGROUND OF THE INVENTION

1. Field of the Invention

The present invention relates to a thermistor element, more precisely, relates to a highly-reliable thermistor element even when used at a relatively high temperature.

2. Description of the Related Art

As for conventionally used thermistor element for measuring temperature, such as of exhaust gas from cars, the thermistor element which could detect up to 800° C. was the mainstream. However, recent demands for detecting temperature, such as of exhaust gas, near the engine are increasing; and that development of thermistor element which could detect high temperature around 850 to 1100° C. is desired.

For instance, Japanese Patent Publication No. 2003-183075 discloses sintered conductive oxide used for conductive material for a thermistor; and its examples exemplifies sintered conductive oxide using yttrium oxide, strontium carbonate, chromic oxide, manganese oxide and aluminum oxide as raw materials. However, thermistor using said sintered conductive oxide is faced with a problem of possessing low reliability for detecting high temperature over 900° C.

SUMMARY OF THE INVENTION

The present invention has been made by considering such situation, and a purpose of the invention is to provide a highly-reliable thermistor element even when used at a relatively high temperature.

In order to achieve the above object, thermistor element according to the invention comprises;

an element body incorporating two or more internal electrode layers arranging thermistor layer in-between, a pair of terminal electrodes each connected to the mutually faced internal electrode layers and formed on exterior surface of the element body, and lead terminal connected to the terminal electrode, characterized in that;

said thermistor layer comprises oxide expressed by a composition formula $Y_a Ca_b Cr_c Al_d M1_e O_3$ wherein relationship between "a" and "b" in the composition formula is "a+b=1", relationship between "c", "d" and "e" in the composition formula is "c+d+e=1", "M1" in the composition formula is at least one selected from Co, Sn, Nd, Pr, Ga, and Ni, "a" in the composition formula is $0.5 \leq "a" \leq 0.99$, "b" in the composition formula is $0.01 \leq "b" \leq 0.50$, "c" in the composition formula is $0.06 \leq "c" \leq 0.64$, "d" in the composition formula is $0.01 \leq "d" \leq 0.94$, and "e" in the composition formula is $0.00 \leq "e" \leq 0.35$, and the thermistor layer substantially does not include Sr and Mn.

The thermistor element comprises the internal electrode layers which preferably comprise Pt.

The thermistor element preferably comprises an insulating layer which at least covering a part where the lead terminal is connected to the terminal electrode.

According to the invention, a highly-reliable thermistor element even when used at a relatively high temperature can be provided. In particular, a therminstor element having little change in resistance value before and after it is used under a high temperature condition can be provided.

DETAILED DESCRIPTION OF THE INVENTION

Hereinafter, the present invention will be described based on embodiments shown in drawings.

Figure 1:
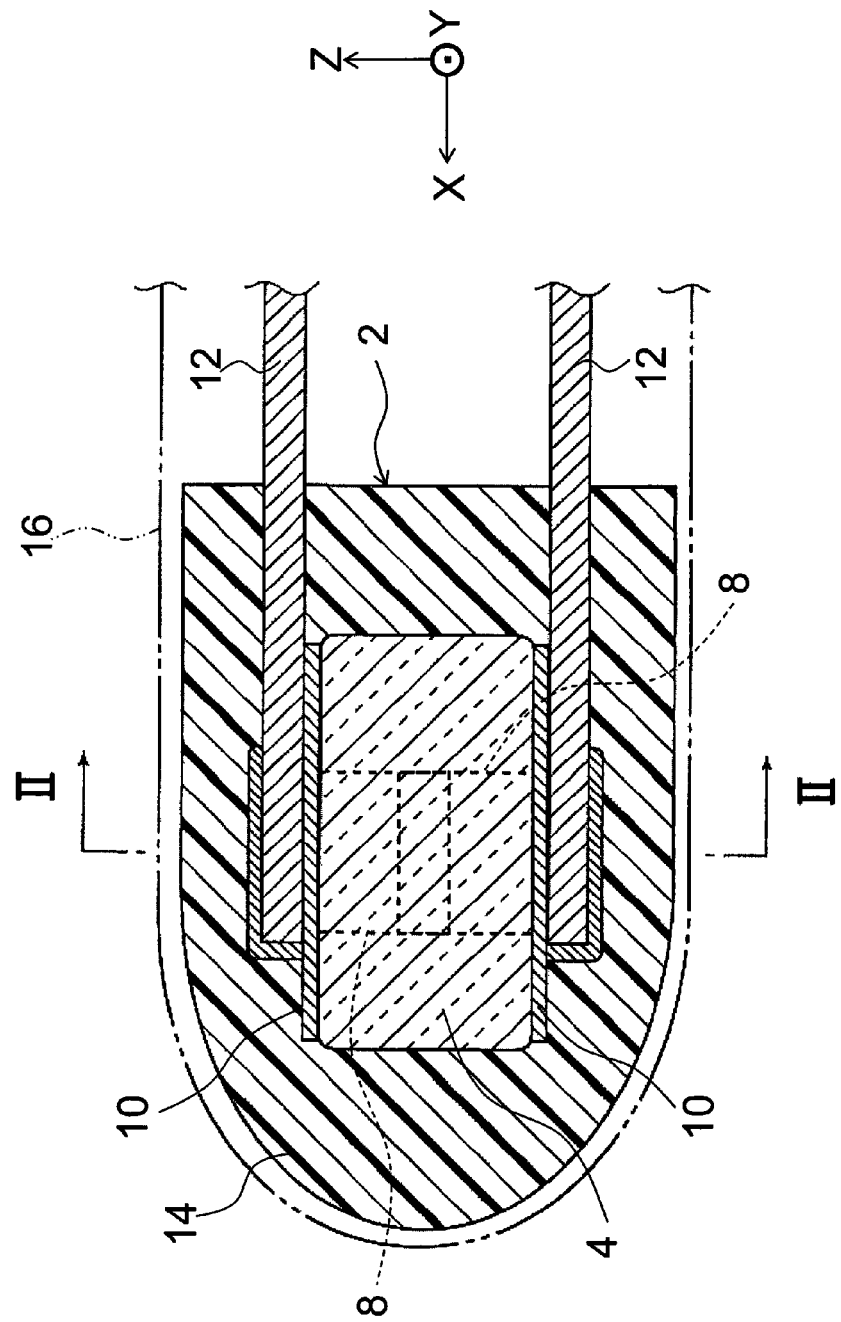
FIG. 1 is a longitudinal cross sectional view showing main part of thermistor element according to an embodiment of the present invention.
Figure 2:
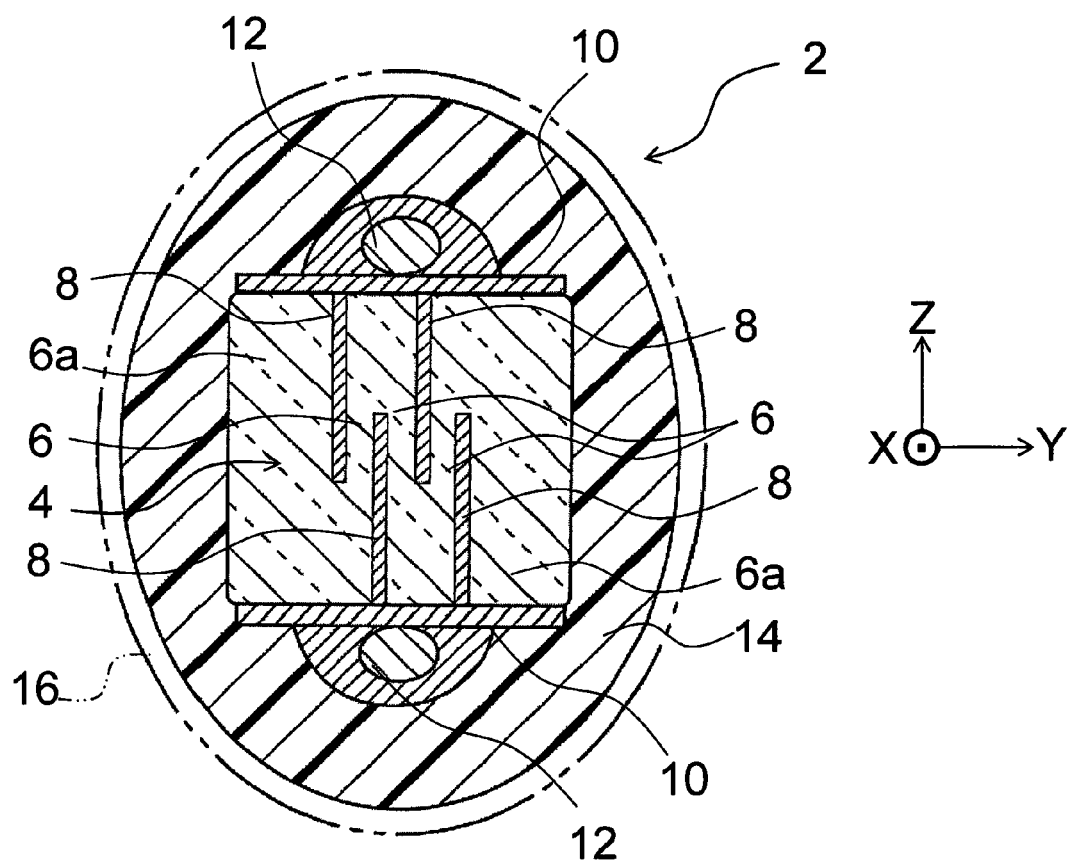
FIG. 2 is a transverse cross sectional view of thermistor element along a line II-II in FIG. 1.

As is shown in FIGS. 1 and 2, thermistor element 2 according to an embodiment of the present invention comprises element body 4, terminal electrode 10, a pair of lead terminals 12, and insulating layer 14.

Although terminal electrode 10 is formed on all surfaces of both end sides in Z-axis direction of element body 4, it is not necessary to be formed on all the surfaces.

Prior ends of paired lead terminals 12 are respectively connected to each terminal electrode 10, such as by bonding paste or by welding. Posterior ends of each lead terminal 12 are extending in X-axis direction, as is shown in FIG. 2.

Insulating layer 14 at least covers a part wherein lead terminal 12 is connected to terminal electrode 10.

As is shown in FIG. 2, in element body 4, internal electrode layers 8 are alternately laminated arranging thermistor layer 6 in between. In the present embodiment, the plane of internal electrode layers 8 are parallel to the plane containing X and Z axes. Some internal electrode layers 8, arranging thermistor layer 6 in between, are connected to one terminal electrode 10, while the other internal electrode layers 8, arranging thermistor layer 6 in between, are connected to the other terminal electrode 10. Therefore, thermistor layer 6, arranged in between internal electrode layers 8 adjacent to said layer 6 in laminating direction (Y-axis), becomes sensor part.

As is shown in FIG. 2, internal electrode layers 8, alternately laminated via thermistor layer 6, are respectively connected to paired terminal electrodes 10 formed on both end sides of element body 4 in the direction of Z-axis. And thermistor layers 6a, which do not function as sensor, are laminated on both ends of element body 4 in laminating direction (Y-axis).

Material of thermistor layer 6, including thermistor layer 6a, of the present embodiment comprises material including oxide expressed by a composition formula $Y_a Ca_b Cr_c Al_d M1_e O_3$, and has NTC characteristic.

Relationship between "a" and "b" in the composition formula is "a+b=1".

Relationship between "c", "d" and "e" in the composition formula is "c+d+e=1".

"M1" in the composition formula is at least one selected from Co, Sn, Nd, Pr, Ga, and Ni, preferably from Co and Sn.

"a" in the composition formula is $0.5 \leq "a" \leq 0.99$. When "a" is within said range, a highly-reliable thermistor element even when used at a relatively high temperature can be obtained. "a" in the composition formula is preferably $0.60 \leq "a" \leq 0.99$, and more preferably $0.70 \leq "a" \leq 0.99$.

"b" in the composition formula is $0.01 \leq "b" \leq 0.50$. When "b" is within said range, a highly-reliable thermistor element even when used at a relatively high temperature can be obtained. "b" in the composition formula is preferably $0.01 \leq "b" \leq 0.40$, and more preferably $0.01 \leq "a" \leq 0.30$.

"c" in the composition formula is $0.06 \leq "c" \leq 0.64$. When "c" is within said range, a highly-reliable thermistor element even when used at a relatively high temperature can be obtained. "c" in the composition formula is preferably $0.10 \leq$ "c" $\leq 0.60$, and more preferably $0.15 \leq$ "c" $\leq 0.55$.

"d" in the composition formula is $0.01 \leq$ "d" $\leq 0.94$. When "d" is within said range, a highly-reliable thermistor element even when used at a relatively high temperature can be obtained. "d" in the composition formula is preferably $0.10 \leq$ "d" $\leq 0.90$, and more preferably $0.25 \leq$ "c" $\leq 0.85$.

"e" in the composition formula is $0.00 \leq$ "e" $\leq 0.35$. When "e" is within said range, a highly-reliable thermistor element even when used at a relatively high temperature can be obtained. "e" in the composition formula is preferably $0.00 \leq$ "e" $\leq 0.30$, and more preferably $0.00 \leq$ "e" $\leq 0.20$.

Thermistor layer of the present embodiment substantially does not include Sr and Mn. In the present embodiment, by not including Sr, crystal structure of thermistor layer can be a single phase which improves reliability of the thermistor element. Further, in the present embodiment, by not including Mn, reliability of thermistor element improves when used at a high temperature.

Note that, "substantially does not include Sr and Mn" in the present embodiment means that it does not contain Sr and Mn more than the degree of impurity, and thus Sr and Mn may be contained in the degree of impurity. Here, "Sr in the degree of impurity" means that content of Sr in thermistor layer is 0.01 mol % or less with respect to the element. And "Mn in the degree of impurity" means that content of Mn in thermistor layer is 0.01 mol % or less with respect to the element.

Since thermistor element of the present embodiment comprises thermistor layer, which comprises oxide expressed by the above formula, a sufficient sintering is possible without including sintering auxiliary agent in the thermistor layer. And since thermistor layer may not include sintering auxiliary agent, reliability of the thermistor element can be improved. Note that $SiO_2$, $Li_2O$, $B_2O_3$, etc. can be exemplified as said auxiliary agent.

Thickness of thermistor layer 6 is not particularly limited; however, 10 to 100 μm or so is preferable in the present embodiment. Further, thickness of thermistor layer 6a laminated on external side is not particularly limited; however, 40 to 600 μm or so is preferable.

As for conducting material constituting internal electrode layer 8, precious metals such as Ag, Pd, Au, Pt and alloys thereof (such as Pt—Pd alloy) and base metals such as Cu, Ni and alloys thereof can be exemplified; however, internal electrode layer 8 of the present embodiment is preferably constituted by Pt, Pt—Pd alloy, Pt—Rh alloy or Pt—Ir alloy, more preferably, by Pt.

Although thickness of internal electrode layer 8 is not particularly limited, 0.5 to 2.0 μm is preferable.

Although material of terminal electrode 10 is not particularly limited; the same material for the conducting material constituting internal electrode layer 8 can be used.

Terminal electrode 10 is formed such as by paste coating or baking treatments. Although thickness of terminal electrode 10 is not particularly limited, 2 to 15 μm is preferable.

Cross sectional shape of lead terminal 12 is not particularly limited, and its cross section may be circular or rectangular shape. When lead terminal 12 is formed by a wired rod having circular cross section, outer diameter of the wire rod is preferably 200 to 500 μm. And when lead terminal 12 is formed by a wired rod having rectangular cross section, cross section size of the wire rod is preferably 0.1 to 0.4 mm×0.2 to 0.5 mm. Although material of lead terminal 12 is not particularly limited, the same material for terminal electrode 10 can be used.

As is shown in FIGS. 1 and 2, ellipsoidal shaped insulating layer 14 covers around element body 4 to cover at least a part wherein prior ends of lead terminal 12 is connected to terminal electrode 10, and to cover all around element body 4 exposing posterior end of lead terminal 12.

Insulating layer 14 preferably comprises oxide of such as Al, Mg and Si, and preferably has heat resistance of 1100° C. or so.

Next, an example of manufacturing method of thermistor element 2 according to the present embodiment is described. Manufacturing method of thermistor element 2 according to the present embodiment is not particularly limited and known methods can be used; however, an example using sheet method will be described hereinafter.

First, a green sheet, on which predetermined pattern of internal electrode layer paste film is formed and internal electrode layer 8 is to be formed on its surface, and the other green sheet on which internal electrode layer is not formed are prepared. The green sheets are formed by the above-mentioned materials constituting thermistor layer. Note that materials of the kind may include around 0.1 wt % or less of unavoidable impurities, such as Si, K, Na and Ni.

And by using the materials, green sheet is prepared by a known method. In particular, for instance, raw materials (such as yttrium oxide, calcium carbonate, chromic oxide and aluminum oxide) of a material constituting thermistor layer are uniformly mixed by wet-mixing and the like, and then dried.

Next, the obtained mixture is calcined under a suitably selected firing condition, preferably at 1000 to 1200° C., then the calcined powder is wet-pulverized. Then thermistor layer paste is obtained by slurrying the pulverized calcined powder by adding binder, organic solvent and the like. The thermistor layer paste is made to a sheet, such as by doctor blade or screen printing method, then said sheet is dried to obtain green sheet.

The internal electrode layer paste includes various kinds of metals mentioned hereinbefore. By coating the internal electrode layer paste on green sheet by printing method and the like, green sheet on which internal electrode layer paste film of predetermined pattern is formed can be obtained.

Next, these green sheets are laminated, adhered by pressure, and cut after going through a necessary process, such as drying process to obtain green chip. The cut process can be performed by Dicing Saw and the like.

The obtained green chip is fired under a predetermined condition, preferably at around 1400 to 1600° C., and a fired body of element body 4 is obtained. Next, terminal electrode paste which becomes terminal electrode after firing is formed on element body 4 by such as transferring method. As for terminal electrode paste, a paste primarily comprising Pt, such as Pt, Pt/Pd, Pt/Rh and Pt/Ir, is exemplified. Then, dried and baked under a suitably selected baking condition, preferably at 1050 to 1250° C.

Next, prior end of lead terminal 12 is bonded to terminal electrode 10, such as by bonding electrode paste or by welding. When welding is used, resistance welding or arc welding may be used. While when bonding electrode paste is used, prior end of lead terminal 12 is bonded to terminal electrode 10 by using bonding electrode paste primarily comprising Pt, such as Pt, Pt/Pd, Pt/Rh and Pt/Ir. And then, dried and posterior end of lead terminal 12 was baked to terminal electrode 10 under a suitably selected baking condition, preferably at 1050 to 1250° C.

Next, insulating layer 14 is formed. First, by using raw material of ceramic constituting insulating layer 14 mentioned hereinbefore, insulating layer paste is prepared by a known method. In particular, such as $Al_2O_3$, MgO and $SiO_2$ are weighed and combined as a starting material and wet mixed for a predetermined time by ball mill and Zr beads. Then, calcined under a suitably selected firing condition, preferably at 1050 to 1250° C., and calcined powder is wet-pulverized. A paste is obtained by adding such as binder or organic solvent to the pulverized calcined powder.

The obtained insulating layer paste is coated, such as by applying or dipping, on a predetermined part of element body 4 where prior end of lead terminal 12 is baked. Then, by firing under a suitably selected firing condition, preferably at 1050 to 1250° C., thermistor element 2 in object wherein element body 4 is covered by insulating layer 14 is obtained.

Thermistor element of the present embodiment, by constituting its therminstor layer by oxide expressed by the composition formula mentioned hereinbefore, is able to provide a highly-reliable thermistor element even when used at a relatively high temperature. In particular, a therminstor element having little change in resistance value before and after it is used at a relatively high temperature can be provided.

In the present embodiment, by not including Sr, crystal structure of thermistor layer can be a single phase expressed by composition formula $Y_aCa_bCr_cAl_dM1_eO_3$, which improves reliability of the thermistor element. Further, in the present embodiment, by not including Mn, reliability of thermistor element improves when used at a high temperature.

Although thermistor layer of the present embodiment includes Cr, during firing, said Cr evaporates from surface of green chip which becomes element body 4 after firing. Therefore, Cr defective layer is formed and different phase such as $Y_4Al_2O_9$, $Y_3Al_5O_{12}$ and $CaCrO_4$ are formed on the surface of element body 4. However, since thermistor element of the present embodiment comprises laminated internal electrode layers 8 arranging thermistor layer 6 in between, sensor part affecting sensor characteristic is not on a surface but inside of element body 4. And that even when different phase is formed on the surface of element body 4; it does not affect sensor part arranged inside of element body 4 and able to maintain a good sensor characteristic.

Since element of "M1" in composition formula of the present embodiment exerts an inhibitory effect on sintering, it is required to set firing temperature of element body high. This leads to more evaporation of Cr which allows more formation of different phase on the surface of element body. However, as is mentioned hereinbefore, since thermistor element of the embodiment has a multilayer structure, different phase formed on the surface does not affect the sensor part. Accordingly, since thermistor element of the embodiment has a multilayer structure, a good sensor characteristic can be maintained even when thermistor layer includes "M1".

Further, as is mentioned hereinbefore, surface of element body 4 of the present embodiment becomes porous since, during firing, Cr evaporates from the surface of green chip, which becomes element body 4 after firing. Therefore, when coating terminal electrode paste on element body 4 or insulating layer paste on element body 4, terminal electrode paste or insulating layer paste is well adhered to element body. As a result, adhesion between element body and terminal electrode as well as adhesion between element body and insulating layer improve, which improves reliability of thermistor element.

Further, linear expansion coefficient of material constituting thermistor layer of the present embodiment and the same of Pt is relatively close. Therefore, by including Pt in internal electrode layer, delamination is unlikely to occur even when thermistor layer and internal electrode layer are simultaneously fired.

Furthermore, when thermistor element is used at a high temperature, delamination by heat shock generally occurs between internal electrode layer and thermistor layer or between terminal electrode layer and thermistor layer. However, as is mentioned hereinbefore, linear expansion coefficient of material constituting thermistor layer of the present embodiment and the same of Pt is relatively close. Therefore, when internal electrode layer or terminal electrode include Pt, even when thermistor element of the present embodiment is repeatedly used at a high temperature, delamination by heat shock is unlikely to occur between internal electrode layer and thermistor layer or between terminal electrode and thermistor layer. Therefore, according to the present embodiment, a highly reliable thermistor element can be obtained by including Pt in internal electrode layer or terminal electrode.

Hereinbefore, embodiments of the present invention are described but the present invention is not limited to the above-mentioned embodiments; and needless to say, it can be carried out in various aspects within the scope of the present invention.

EXAMPLES

Hereinafter, further details of the present invention will be described by examples which flesh out embodiments of the present embodiment, but the present invention is not limited to the examples.

(Samples 1 to 38, 41 to 44)
Preparing Thermistor Layer Paste

As for raw material of material constituting thermistor layer, yttrium oxide, calcium carbonate, chromic oxide, aluminum oxide, cobalt oxide, tin oxide, neodymium oxide, praseodymium oxide, gallium oxide, nickel oxide, samarium oxide, manganese oxide and strontium carbonate are prepared and respectively weighed to make ratio of "a", "b", "c", "d" and "e" in chemical formula $Y_aCa_bCr_cAl_dM1_eO_3$ as is shown in Table 1. These raw materials were wet-mixed for 16 hours by ball mill, dried and mortar and muddler were used to make a powder form. The obtained powder was put to alumina sagger and calcined for 2 hours at 800 to 1200° C.

After the obtained calcined powder was pulverized by ball mill, the powder was dried and dehydrated to make a raw material for thermistor composition.

In the example, by using the obtained raw material for thermistor composition, thermister samples of both multilayered type thermistor (a multilayer product) and single sheet type thermistor (a single sheet product) were prepared. First, manufacturing multilayered type thermistor will be described below.

Manufacturing Multilayered Type Thermistor Sample 100 parts by weight of the obtained raw material for thermistor composition, 10 parts by weight of polyvinyl butyral resin, 5 parts by weight of dioctyl phthalate (DOP) as plasticizer and 100 parts by weight of alcohol as solvent were mixed by ball mill and pasted to obtain thermistor layer paste.

By using thermistor layer past obtained by the above method and internal electrode layer paste, multilayered type thermistor 2 as shown in FIG. 1 was manufactured by the method described hereinafter. Note that, in the example, Pt was used for conducting material of internal electrode layer paste.

First, by using the obtained thermistor layer paste, green sheet was formed on PET film by doctor blade method. And by using internal electrode layer paste, internal electrode pattern film was printed on the green sheet by screen printing, manufacturing green sheet printed with internal electrode pattern film.

Next, separately from the abovementioned green sheet, by forming a green sheet on PET film by doctor blade method using the thermistor layer paste, a green sheet on which internal electrode pattern film is not printed was manufactured.

Then each green sheet manufactured as mentioned hereinbefore was alternately laminated and the obtained multilayered body was heated and pressurized to manufacture green chip.

The obtained green chip was then cut to a predetermined size and was subject to binder removal treatment, firing and annealing in the following conditions, to obtain element body.

The binder removal treatment conditions were;
temperature rising rate: 30° C./hour,
holding temperature: 300 to 400° C.,
temperature holding time: 8 hours, and
atmosphere: in the air.

The firing conditions were;
temperature rising rate: 200° C./hour,
holding temperature: 1400 to 1600° C.,
temperature holding time: 2 hours,
cooling rate: 200° C./hour, and
atmosphere: in the air.

The annealing conditions were;
temperature rising rate: 200° C./hour,
holding temperature: 600 to 800° C.,
temperature holding time: 2 hours,
cooling rate: 200° C./hour, and
atmosphere: in the air.

After polishing end faces of the obtained element body with sandblast, terminal electrode paste including Pt was coated to obtain a sample of multilayered type thermistor 2 shown in FIG. 1. Further, a number of thermistor layers arranged in between internal electrode layers was made to be 3.

Manufacturing a Single Sheet Type Thermistor Sample

With respect to 100 parts by weight of the obtained raw material for thermistor composition, 1.5 parts by weight (solid content) of polyvinyl alcohol was added, and then granulated by mortar and muddler to make granulated powder. The powder was pressure formed to a circular plate form having diameter of 16 mm and thickness of 2.5 mm, to obtain a formed body.

Next, after the formed body was heated for 2 hours at 600° C. in atmosphere and applied with binder removing treatment, the formed body was then fired for 2 hours at 1400 to 1600° C. in atmosphere to obtain a sintered body.

Then, a paste including Pt was screen printed on both sides of the obtained sintered body, baked at 1100° C., and electrode was formed to obtain a single sheet type thermistor sample.

Resistance change rate for samples 1 to 38 and 41 to 44, samples of multilayered type thermistor and single sheet type thermistor, were respectively evaluated with the following procedure.

Resistance Change Rate

Sample was held for 1000 hours under an atmospheric environment at 1100° C.; and resistance value (Rs, unit of $\Omega$) before holding for 1000 hours under an atmospheric environment at 1100° C. and also resistance value (Rf, unit of $\Omega$) after holding for 1000 hours under an atmospheric environment at 1100° C. were respectively measured. And then resistance change rate ($\Delta R$, unit of %) was calculated by the following formula.

$$\Delta R = (|Rs - Rf|)/Rs \times 100$$

Direct current four-terminal method was used for measuring the resistance values. Further, in the present examples, $\Delta R$ values of 5.0% or less were considered good. Results are shown in Table 1.

TABLE 1

| | component | | | | | | shelf test at 1100° C. after 1000 h | |
|---|---|---|---|---|---|---|---|---|
| No. | Y a | Ca b | Cr c | Al d | M1 e | element of M1 | single sheet product $\Delta$ R (%) | multilayer product $\Delta$ R (%) |
| 1 | 0.450 | 0.550 | 0.200 | 0.800 | — | — | 7.2 | 6.9 |
| 2 | 0.500 | 0.500 | 0.200 | 0.800 | — | — | 6.8 | 4.7 |
| 3 | 0.700 | 0.300 | 0.200 | 0.800 | — | — | 6.2 | 3.5 |
| 4 | 0.900 | 0.100 | 0.200 | 0.800 | — | — | 5.3 | 2.4 |
| 5 | 0.990 | 0.010 | 0.200 | 0.800 | — | — | 6.2 | 4.9 |
| 6 | 0.995 | 0.005 | 0.200 | 0.800 | — | — | 8.8 | 7.9 |
| 7 | 0.900 | 0.100 | 0.050 | 0.950 | — | — | 6.3 | 5.4 |
| 8 | 0.900 | 0.100 | 0.060 | 0.940 | — | — | 6.2 | 4.5 |
| 9 | 0.900 | 0.100 | 0.400 | 0.600 | — | — | 5.4 | 3.2 |
| 10 | 0.900 | 0.100 | 0.500 | 0.500 | — | — | 5.2 | 3.0 |
| 11 | 0.900 | 0.100 | 0.640 | 0.360 | — | — | 5.8 | 4.7 |
| 12 | 0.900 | 0.100 | 0.650 | 0.350 | — | — | 6.3 | 5.8 |
| 13 | 0.900 | 0.100 | 0.500 | 0.400 | 0.100 | Co | 5.2 | 4.0 |
| 14 | 0.900 | 0.100 | 0.500 | 0.300 | 0.200 | Co | 5.1 | 3.6 |
| 15 | 0.900 | 0.100 | 0.500 | 0.150 | 0.350 | Co | 5.7 | 4.7 |
| 16 | 0.900 | 0.100 | 0.500 | 0.100 | 0.400 | Co | 7.6 | 6.7 |
| 17 | 0.900 | 0.100 | 0.500 | 0.400 | 0.100 | Sn | 5.3 | 3.1 |
| 18 | 0.900 | 0.100 | 0.500 | 0.300 | 0.200 | Sn | 5.5 | 3.9 |
| 19 | 0.900 | 0.100 | 0.500 | 0.150 | 0.350 | Sn | 5.8 | 4.6 |
| 20 | 0.900 | 0.100 | 0.500 | 0.100 | 0.400 | Sn | 6.6 | 5.8 |
| 21 | 0.900 | 0.100 | 0.500 | 0.400 | 0.100 | Nd | 6.4 | 3.6 |
| 22 | 0.900 | 0.100 | 0.500 | 0.300 | 0.200 | Nd | 6.3 | 3.7 |
| 23 | 0.900 | 0.100 | 0.500 | 0.150 | 0.350 | Nd | 6.0 | 4.6 |
| 24 | 0.900 | 0.100 | 0.500 | 0.100 | 0.400 | Nd | 6.2 | 6.0 |
| 25 | 0.900 | 0.100 | 0.500 | 0.400 | 0.100 | Pr | 6.2 | 4.1 |
| 26 | 0.900 | 0.100 | 0.500 | 0.300 | 0.200 | Pr | 5.9 | 3.8 |
| 27 | 0.900 | 0.100 | 0.500 | 0.150 | 0.350 | Pr | 6.1 | 4.8 |
| 28 | 0.900 | 0.100 | 0.500 | 0.100 | 0.400 | Pr | 6.2 | 5.3 |
| 29 | 0.900 | 0.100 | 0.500 | 0.400 | 0.100 | Ga | 5.5 | 4.1 |
| 30 | 0.900 | 0.100 | 0.500 | 0.300 | 0.200 | Ga | 5.7 | 4.6 |

TABLE 1-continued

| | | | | | | | shelf test at 1100° C. after 1000 h | |
|---|---|---|---|---|---|---|---|---|
| | Y | Ca | Cr | Al | M1 | element | single sheet | multilayer |
| No. | a | b | c | d | e | of M1 | product $\Delta$ R (%) | product $\Delta$ R (%) |
| 31 | 0.900 | 0.100 | 0.500 | 0.150 | 0.350 | Ga | 5.8 | 4.7 |
| 32 | 0.900 | 0.100 | 0.500 | 0.100 | 0.400 | Ga | 6.0 | 5.8 |
| 33 | 0.900 | 0.100 | 0.500 | 0.400 | 0.100 | Ni | 6.2 | 4.1 |
| 34 | 0.900 | 0.100 | 0.500 | 0.300 | 0.200 | Ni | 5.8 | 3.8 |
| 35 | 0.900 | 0.100 | 0.500 | 0.150 | 0.350 | Ni | 5.9 | 4.8 |
| 36 | 0.900 | 0.100 | 0.500 | 0.100 | 0.400 | Ni | 5.9 | 5.5 |
| 37 | 0.900 | 0.100 | 0.500 | 0.300 | 0.200 | Mn | 9.3 | 9.0 |
| 38 | 0.900 | 0.100 | 0.500 | 0.300 | 0.200 | Sr | 9.6 | 9.2 |

From samples 1 to 12, it was confirmed that when ratio of "Y" is 0.450<"a"<0.995, preferably 0.5≦"a"≦0.99, ratio of "Ca" is 0.005<"b"<0.550, preferably 0.01≦"b"≦0.50, ratio of "Cr" is 0.05<"c"<0.650, preferably 0.06≦"c"≦0.640, ratio of "Al" is 0.01≦"d"<0.950, preferably 0.01≦"d"≦0.940 and ratio of "M1" is 0.00≦"e"≦0.35 (samples 2 to 5 and 8 to 11), in comparison to the samples wherein the ratios of "Y", "Ca", "Cr", "Al" and "M1" are without said range (samples 1, 6, 7 and 12), resistance change rate of multilayer product becomes good.

From samples 13 to 38 and 41 to 44, it was confirmed that, even when "M1" is Co, Sn, Nd, Pr, Ga or Ni, when ratio of "Y" is 0.450<"a"<0.995, preferably 0.5≦"a"≦0.99, ratio of "Ca" is 0.005<"b"<0.550, preferably 0.01≦"b"≦0.50, ratio of "Cr" is 0.05<"c"<0.650, preferably 0.06≦"c"≦0.640, ratio of "Al" is 0.01≦"d"<0.950, preferably 0.01≦"d"≦0.940 and ratio of "M1" is 0.00≦"e"<0.400, preferably 0.00≦"e"≦0.350 and neither "Mn" nor "Sr" is included in thermistor layer (samples 13 to 15, 17 to 19, 21 to 23, 25 to 27, 29 to 31, 33 to 35 and 41 to 43), in comparison to the samples wherein the ratios of "M1" is without said range (samples 16, 20, 24, 28, 32, 36 and 44) or the samples wherein Mn or Sr is included as "M1" (samples 37 and 38), resistance change rate of multilayer product becomes good.

It would appear that, since multilayer product of sample 37 includes Sr in thermistor layer, as for crystal structure of said thermistor layer, it formed not only crystal structure expressed by composition formula $Y_aCa_bCr_cAl_dM1_eO_3$ but also the same of $Y_aSr_bCr_cAl_dM1_eO_3$. And as a result, sensor part of the thermistor layer did not become a single phase and resistance change rate became high.

It would appear that, since multilayer product of sample 38 includes Mn in thermistor layer, resistance change rate became high at high temperature.

Further, from samples 1 to 38 and 41 to 44, when raw materials for thermistor composition included in thermistor layer of a single sheet product and of a multilayer product are the same, it was confirmed that the resistance change rate of multilayer product is better than the same of single sheet product.

Since each sample of the present examples include "Cr", "Cr" evaporated from the surface of green chip of multilayer product or the surface of formed body of single sheet product. And as a result, it would appear that Cr defective layer was formed on the surface of element body of multilayer product or sintered body of single sheet product for each sample, which lead to formation of different phase such as $Y_4Al_2O_9$, $Y_3Al_5O_{12}$ and $CaCrO_4$.

However, since multilayer product comprises laminated internal electrode layers arranging thermistor layer in between; sensor part affecting sensor characteristic was not on a surface but inside of element body. Therefore, it would appear that even when different phase was formed on the surface of element body, it did not affect sensor part arranged inside of element body and a good sensor characteristic was maintained.

On the other hand, since single sheet product forms electrode on the surface of its sintered body, sensor part is on the surface of the sintered body. Therefore, it would appear that different phase formed on the surface of sintered body affected sensor characteristic and that resistance change rate of single sheet product became high in comparison to the same of multilayer product.

The invention claimed is:

1. A thermistor element comprising:
  element body incorporating two or more internal electrode layers arranging thermistor layer in-between,
  a pair of terminal electrodes each connected to the mutually faced internal electrode layers and formed on exterior surface of the element body, and
  lead terminal connected to the terminal electrode, characterized in that;
  the thermistor layer comprises oxide expressed by a composition formula $Y_aCa_bCr_cAl_dM1_eO_3$ wherein
  relationship between "a" and "b" in the composition formula is "a+b=1",
  relationship between "c", "d" and "e" in the composition formula is "c+d+e=1",
  "M1" in the composition formula is at least one selected from Co, Sn, Nd, Pr, Ga, and Ni,
  "a" in the composition formula is 0.5≦"a"≦0.99,
  "b" in the composition formula is 0.01≦"b"≦0.50,
  "c" in the composition formula is 0.06≦"c"≦0.64,
  "d" in the composition formula is 0.01≦"d"≦0.94, and
  "e" in the composition formula is 0.00≦"e"≦0.35, and
  the thermistor layer substantially does not include Sr and Mn.

2. The thermistor element as set forth in claim 1 wherein the internal electrode layers comprise Pt.

3. The thermistor element as set forth in claim 1, further comprising an insulating layer at least covering a part where the lead terminal is connected to the terminal electrode.

4. The thermistor element as set forth in claim 2, further comprising an insulating layer at least covering a part where the lead terminal is connected to the terminal electrode.

* * * * *